United States Patent
Siri

(12) 
(10) Patent No.: US 6,775,160 B2
(45) Date of Patent: Aug. 10, 2004

(54) DYNAMIC DC SOURCE AND LOAD ENERGY RECYCLING POWER SYSTEM

(75) Inventor: Kasemsan Siri, Torrance, CA (US)

(73) Assignee: The Aerospace Corporation, El Segundo, CA (US)

(*) Notice: Subject to any disclaimer, the term of this patent is extended or adjusted under 35 U.S.C. 154(b) by 33 days.

(21) Appl. No.: 10/256,694

(22) Filed: Sep. 27, 2002

(65) Prior Publication Data

US 2004/0062063 A1 Apr. 1, 2004

(51) Int. Cl.[7] .............................................. H02M 5/42
(52) U.S. Cl. ...................................... 363/89; 363/125
(58) Field of Search .......................... 363/84, 89, 97, 363/39, 40, 44, 125

(56) References Cited

U.S. PATENT DOCUMENTS

| | | | | |
|---|---|---|---|---|
| 5,381,327 A | * | 1/1995 | Yan | 363/24 |
| 5,615,097 A | * | 3/1997 | Cross | 363/84 |
| 5,623,171 A | * | 4/1997 | Nakajima | 307/106 |
| 5,962,989 A | * | 10/1999 | Baker | 315/294 |
| 6,002,596 A | * | 12/1999 | Mayer et al. | 363/21.04 |
| 6,008,589 A | * | 12/1999 | Deng et al. | 315/209 R |
| 6,191,568 B1 | * | 2/2001 | Poletti | 323/268 |
| 6,362,980 B1 | * | 3/2002 | Ohashi et al. | 363/21.01 |
| 6,577,513 B1 | * | 6/2003 | Chang et al. | 363/37 |

* cited by examiner

Primary Examiner—Michael Sherry
Assistant Examiner—Gary L. Laxton
(74) Attorney, Agent, or Firm—Derrick Michael Reid

(57) ABSTRACT

A power recycling system receives input power at an input and feeds back through an auxiliary output recycled power to the input for supplementing the input power for recycling energy of the recycled power that would normally be wasted so as to provide improved power efficiency. The system can have several configurations, including a system for testing power supplies under test, or can be any electrical device, system, appliance or electronic load having a power input and auxiliary output for feeding back recycled energy to the power input.

11 Claims, 7 Drawing Sheets

ENERGY RECYCLED POWER CONVERTER SYSTEM

ENERGY RECYCLED POWER CONVERTER SYSTEM

ENERGY RECYCLED POWER CONVERTER ISOLATED LOAD SYSTEM

ENERGY RECYCLED POWER CONVERTER TRUNCATED FEEDBACK SYSTEM

ENERGY RECYCLED STEP-UP VOLTAGE CONVERTER SYSTEM

ENERGY RECYCLED STEP-DOWN VOLTAGE CONVERTER SYSTEM

LOAD CONTROLLER

TRANSIENT STABILIZER CIRCUIT

DYNAMIC DC SOURCE AND LOAD ENERGY RECYCLING POWER SYSTEM

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of power recycling power supplies. More particularly, the present invention relates to a system for controlling and recycling power in electronic devices such as power supplies, power converters, and electrical devices.

BACKGROUND OF THE INVENTION

As the computer and communications industries continue to expand, there will be an increased need for better utilization of electric power. At the same time, the electric utility supply grid is seeing an increase in the demand from electric power by power consuming components. To recycle power, some power systems have flushed excess power back to the utility power grid. During the testing of power systems, it is also desirable to have an ability to accurately measure the performance of each power consuming component or device to verify that power parameters are within specified tolerances with a minimal use of electric power by power supply systems and devices.

Prior power supply systems have used a variety of components for improved power delivery, stability and consumption. Power systems have used power converters with active power factor correction with near unity power factor of the input power absorbed from the utility grid, have used transient stabilizers for stabilizing power input lines and power output lines, have used over and under voltage and current protection, and have used power controllers for controller delivery to power supplies under tests and other electronic devices and loads. The consumption of power during testing of power supplies can be large. Many devices, such as power supplies under test and commercial electrical devices and appliances also require electrical energy that is partially wasted.

The ratio of energy used to power the electrical devices over the total power consumed is the power efficiency. That is, the system performance can be measured as the ratio of the output power of the system under test to the input power from the utility grid. Often power is wasted in the loads attached to power supplies resulting in low power efficiency. The higher the efficiency ratio, the more energy savings. Hence, power supply system designers have long sought to improve the power efficiency of power supplies and power systems as well as all electrical devices and loads.

In conventional testing and validation applications of power supplies, the cost of the power conversion systems that are designed for very high power applications, dramatically adds to the overhead cost of product development. The test loads consume all of the input energy resulting in heat generation during testing that can further increase the total power consumption of a test facility, such as through the use of required air conditioning. This resulting power utilization further contributes to the overhead expense of the testing operation. It is desirable to have test electrical systems and loads provide significant cost savings based on actual reduced total energy usage. Recycling load power of a power system can significantly reduce the power consumption from the utility grid. Some power generators recycle stored energy in fly wheels during utility power outages. However, most power supplies, electronic systems, and electrical devices receive input power used to operate load devices, but then waste energy by failing to recycle excess energy in the load devices. These and other disadvantages are solved or reduced using the present invention.

SUMMARY OF THE INVENTION

An object of the invention is to provide a system for recycling power.

Another object of the invention is to provide a system for recycling electrical energy.

Yet another object of the invention is to provide a system for recycling electrical energy used in power supplies under test.

Still another object of the invention is to provide a system for recycling electrical energy in electrical loads.

A further object of the invention is to provide a system for recycling electrical power in an electronic device having an auxiliary power output for feeding back electrical energy to the power input of the electronic device.

Yet a further object of the invention is to provide recycling of electrical energy in an electromechanical or electrooptical device having an auxiliary power output for feeding back electrical energy to the power input of the device.

The system is directed to recycling power passing through an power system and an electrical load that receives electrical energy from a power source and provides an auxiliary output feeding back electrical energy to the electrical power input of the power system. In a preferred form, the power system can be an electrical system under test, such as a power supply having a power input and a load output driving a load with a load auxiliary output fed back to the input of the power supply for reusing the fed back electrical energy that would otherwise be wasted.

In the preferred form, the system uses a smart electronic load that absorbs the output power from the system under test with controllable load characteristics. Transient stabilizers can be used for ensuring reliable power system stability with the transient stabilizers terminated across a feed back path extending from the auxiliary output of the load to the input of the test system. Under and over voltage and current limiters can be also used for improved stabilization in the preferred form. For example, a transient stabilizer can have an input voltage limiter that is used for limiting the input voltage. A power factor correction converter can be also used for improved power efficiency delivery to the system under test, in the preferred form. The system provides a unidirectional power flow between the utility grid and the system under test and load, and therefore, simplifies the design of the recycled power testing system without flushing the recycled power directly back into the utility power grid.

The system enables economical testing of DC-to-DC power converters with significant saving of the electrical energy usage in a DC-to-DC converter system. The system also enables energy savings in any device equipped with an auxiliary output for feeding back unused energy to the power input. Hence, the system has wide applications to power supply testing as well as any electrical device modified for feeding back unused energy. These and other advantages will become more apparent from the following detailed description of the preferred embodiment.

DETAILED DESCRIPTION OF THE PREFERRED EMBODIMENT

Figure 1:
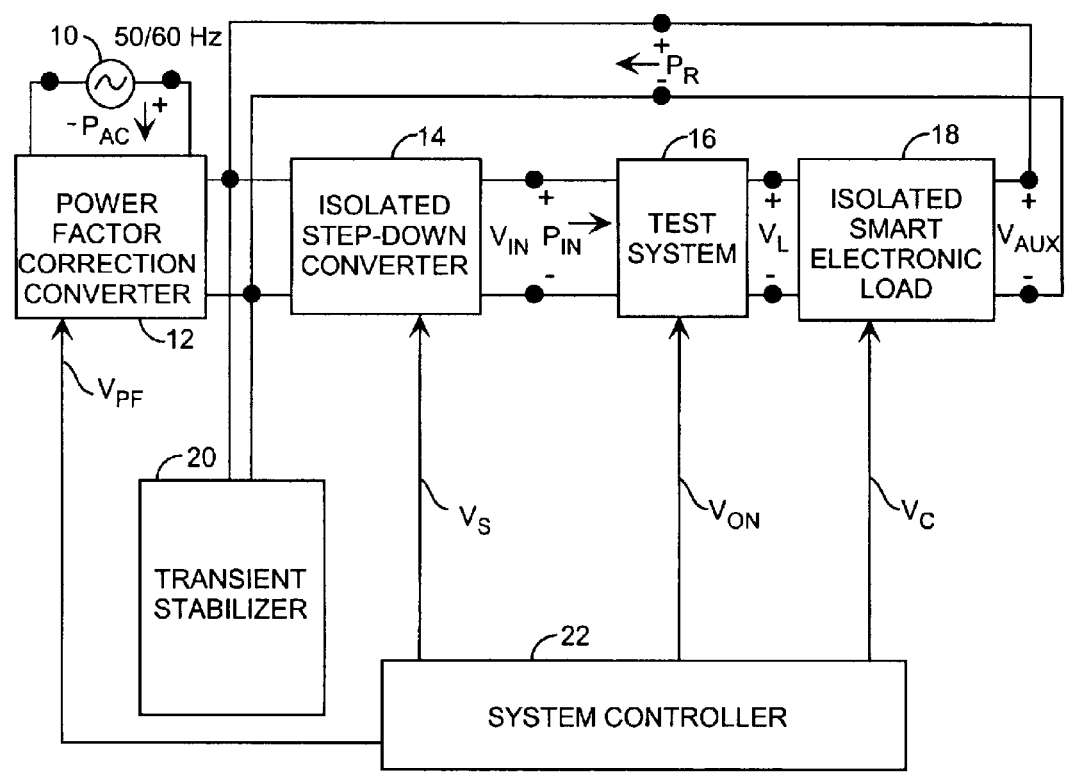
FIG. 1 is a block diagram of an energy recycled power converter system.

An embodiment of the invention is described with reference to the figures using reference designations as shown in the figures. Referring to FIG. 1, an energy recycled power converter system receives conventional source power 10 from a utility. The source power is fed into a power factor correction converter 12 having an output that is connected to an isolated step-down converter 14. The converter 14 provides a $V_{IN}$ input to a test system 16 that then provides a load voltage $V_L$ to an isolated smart electronic load 18. The load 18 has an auxiliary output $V_{AUX}$ that communicates recycled power to the input of the isolated step-down converter 14 at the output of the power factor correction converter 12. The power factor correction converter 14 provides unity power factor correction for reduced $I_{AC}$ harmonic losses. The output of the power factor correction converter 12 is also connected to a transient stabilizer 20 for stabilizing the $V_{AUX}$ voltage level.

A system controller 22 provides a $V_S$ step-down control signal to the isolated step-down converter 14, provides a $V_{ON}$ control signal to the test system 16, and provides a $V_C$ control signal to the isolated smart electronic load 18. The $V_C$ control signal controls the load characteristics of the load 18. The load 18 can be a programmable load to provide a selectable load impedance curve. The $V_S$ control signal controls the step-down voltage amount. The $V_{ON}$ and $V_{PF}$ control signals are on or off control signals.

The system absorbs the electrical power delivered from the utility grid 10 to accommodate power dissipation within the subsystems 12, 14, 16, 18, 20, and 22, while the system under test 16 can be tested at a much higher power throughput. The isolated smart electronic load 18 absorbs the electrical energy delivered from the system under test 16 at the $V_L$ output and passes most of the absorbed energy back to the input port of the isolated step-down converter 14 for providing a stabilized DC input voltage $V_{IN}$ and input power $P_{IN}$ to the input of the system under test 14. The feeding back of the load energy to the input conserves power consumption.

The isolated smart electronic load 18 is a highly efficient DC-to-DC converter that can be programmed to have different characteristics, as needed, such as, presenting a resistive load, a constant current sink, a constant voltage sink, or a constant power load to the test system 16. The stabilized DC power source for the system under test 16 is a highly efficient AC-to-DC power source consisting of the power factor correction converter 12 and the step-down converter 14 that are connected in cascade, and between which is connected the transient stabilizer 20. The stabilized input voltage $V_{IN}$ that provides the input power $P_{IN}$ is an output from the step-down converter 14 that processes both the AC utility power $P_{AC}$ from the utility grid 10 and the recycled power $P_R$ into a regulated output voltage $V_{IN}$ as an input to the test system 16.

For system stabilization, there is preferably sufficient energy storage within the transient stabilizer 20 that is terminated across the output of the power factor correction converter 12 and the input of the isolated step-down converter 14. The transient stabilizer 20 may, for example, include capacitive electrical charge storage that holds and filters ripple energy transferred from the utility grid 10 and the recycled energy $P_R$ from the smart electronic load 18 so that the power quality at the input of the test system 16 remains well regulated especially during line and load transients. Consequently, the stabilized DC power source 12, 14, or 20 functions as a resistive load to the utility grid 10 because of the near unity power factor correction and low harmonic contents in the AC line current of the utility grid 10.

The power factor correction converter 12 rectifies and converts the AC utility voltage 10 into a suitable DC output voltage. The power factor correction converter output voltage is in the range of 350V to 400V. A boost-derived power converter is the preferred converter for power factor correction converter 12 when the utility grid 10 has the AC line voltage peak lower than the operating DC output voltage of the power factor correction converter 12. When a utility grid 10 has an AC line voltage peak above the power factor correction converter output voltage, a dual-mode buck-boost derived power factor correction converter 12 may be used instead. An internal voltage regulation control loop of the power factor correction converter 12 typically has low control bandwidth as compared to the AC line frequency, such as 10 Hz to 15 Hz at unity gain for 50-to-60 Hz utility systems. Power factor correction converters 12 are commonly available.

The power factor correction converter 12 reduces the harmonic content in the line current from the utility grid 10, and the step-down converter 14 converts the 400V input voltage to a DC level compatible to the test system 16 input voltage range. The smart electronic load 18 provides desired load characteristics and provides an auxiliary output port at $V_{AUX}$ for recycling the unused electrical energy back to the 400V input of the isolated step-down converter 14 that is also the output of power factor correction converter 12. The transient stabilizer 20 then provides voltage transient absorption across the 400V $V_{AUX}$ output while the system controller 22 provides a sequence of turn-on and a turn-off controls for the individual power units 12, 14, and 16 for reducing power on and power off transients.

The isolated step-down converter stage 14 provides a DC-to-DC voltage conversion with an internal fast voltage regulation control loop, which is adequately stabilized with sufficient unity gain bandwidth, such as the unity gain crossover frequency of 1 kHz. The step-down converter output voltage can be programmed to have a step-down voltage to fit within the input-voltage specification of the test system 16. The step-down converter 14 should also include a line filter to significantly reduce the input current and switching ripple drawn from the output of the power factor correction converter 12. Isolated step-down converters are also commonly available.

The test system 16 may be a system under test, such as a DC-to-DC converter or a group of DC-to-DC converters that are interconnected to have an input power port and an output power port that are respectively connected to the output of the step-down converter 14 and the input of the smart electronic load 18. The smart electronic load 18 should have a fast control loop to either regulate the input or output voltage or input or output current of the load 18 to obtain desired load characteristics. The isolated smart electronic load 18 can have line and output filters respectively at the input and output such that switching ripples superimposed on the line current and output voltage are minimized to not deteriorate system stability performance. High efficiency DC-to-DC converters can be used as a load 18. A DC-to-DC converter can be used as electronic load to recycle load power to DC power source, with part of the testing power being recycled from the electronic load 18 to the test system 16. The higher the efficiency of electronic load 18, the less the power loss in the complete system.

The system controller 22 provides overall system control. The system controller 22 provides a set point voltage signal $V_S$ to regulate the step-down converter output voltage of the step-down converter 14, provides an on and off control signal $V_{ON}$ communicated to the test system 16, provides a load control signal $V_C$ for selecting one profile of several possible load characteristics, and provides a $V_{PF}$ shut-down signal communicated to the power factor correction converter 12 for shutting down the system in a control manner without generating large transients.

A consumed power ratio Pac/Pin is used to determine power efficiency. The term Pac/Pin is defined as a consumed power ratio equation that is Pac/Pin=$(1-\eta_{SDC}\cdot\eta_{SUT}\cdot\eta_{SEL})/(\eta_{SDC}\cdot\eta_{PFC})$. In the consumed power ratio equation, the subscript SEL is for the smart electronic load 18, the subscript SUT is the test system 16 that is a system under test, the subscript SDC is for the step-down converter 14, and the subscript PFC is for the power factor correction converter 12, where $\eta$ is the efficiency of the respective stage 12, 14, 16, and 18. The ratio Pac/Pin=33.45% for all stages with 90% efficiency, that is, with $\eta$=0.9. The ratio Pac/Pin is 43.8% for $\eta_{SDC}$=0.85, $\eta_{SUT}$=0.8, $\eta_{SEL}$=$\eta_{PFC}$=0.95. The ratio Pac/Pin is 53.4% for all stages with 85% efficiency, and the ratio Pac/Pin is 76.25% for all stages with 80% efficiency. The system offers energy saving of 24% to 67% for converter efficiency range of 80% to 90%, revealing significant reduction in energy consumption.

Figure 2:
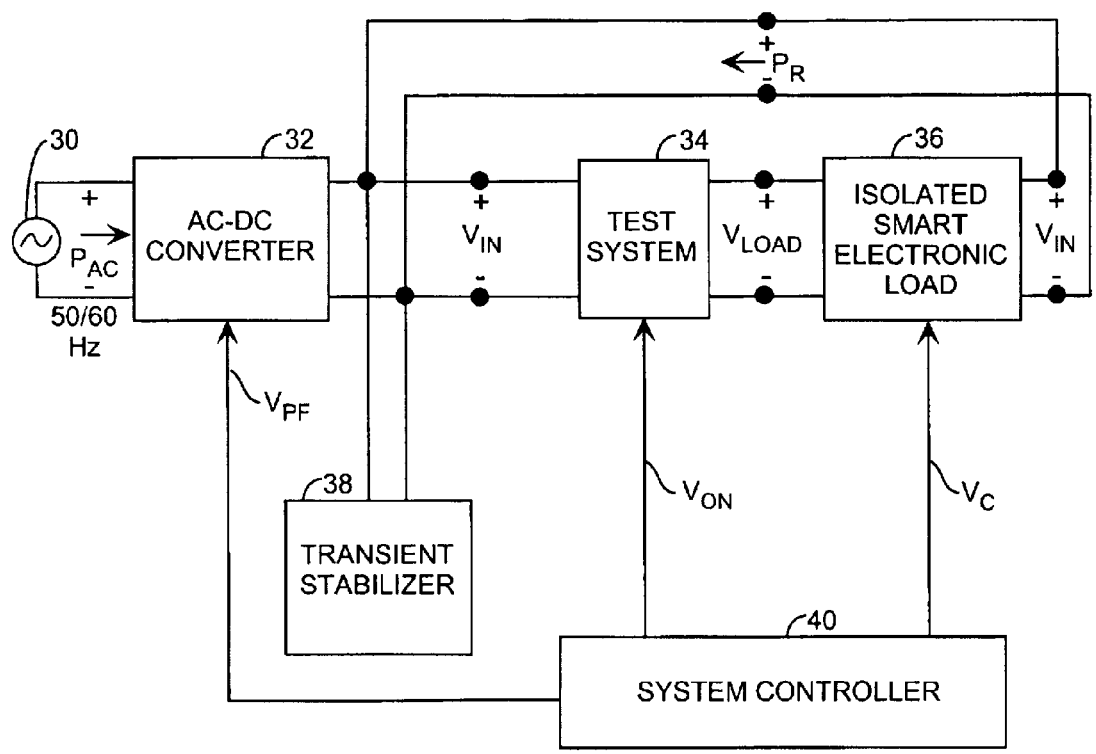
FIG. 2 is a block diagram of an energy recycled power converter isolated load system.

Referring to FIGS. 1 and 2, and more particularly to FIG. 2, an energy recycled power converter isolated load system also receives utility power 10 from the utility grid and uses an AC-to-DC converter 32 for providing the $V_{IN}$ voltage directly to a test system 34 having a $V_L$ output driving an isolated smart electronic load 36. The AC-to-DC converter 32 is used for driving a linear load, and hence no power factor correction is used. The AC-to-DC converter 32 provides output isolation to the test system 34. The $V_{IN}$ output of the isolated smart electronic load 36 is fed back to the $V_{IN}$ input to the test system 34 for feeding back recycled power $P_R$ as reused electrical energy. A transient stabilizer 38 is again used to stabilize the input voltage $V_{IN}$ to the test system 34. The AC-to-DC converter 32 typically has a control knob, not shown, for setting the amount of step-down AC-to-DC conversion. The conversion amount can also be controlled by a system controller 40. The system controller 40 is used to control the system using the $V_{PF}$, $V_{ON}$, and $V_C$ control signals. The test system 34 may be adapted to be controlled for output regulation, input regulation, and current limiting modes, using control functions of the system controller 40. The energy recycled power converter isolated load system of FIG. 2 differs from the energy recycled power converter system of FIG. 1, in that, the power source to the test systems 16 and 34 is different,
where the energy recycled power converter of FIG. 1 includes the step-down converter 14 and the power factor correction converter 12, whereas as the energy recycled power converter isolated load system of FIG. 2 includes the AC-to-DC converter 32.

For the energy recycled power converter isolated load system of FIG. 2, the consumed power ratio Pac/Pin is equal to $(1-\eta_{SUT}\cdot\eta_{SEL})/(\eta_{SDC}\cdot\eta_{PFC})$. The ratio Pac/Pin is 23.45% for all stages with 90% efficiency, where $\eta$=0.9. The ratio Pac/Pin is 29.7% for $\eta_{SDC}$=0.85, $\eta_{SUT}$=0.8, and $\eta_{SEL}$=$\eta$PFC=0.95. The ratio Pac/Pin is 38.4% for all stages with 85% efficiency. The ratio Pac/Pin is 56.25% for all stages with 80% efficiency. Here, the recycled power through the shorter feed back path in the energy recycled power converter isolated load system of FIG. 2, offers the more energy savings. Practically, about half of the required testing power is consumed. The system provides energy saving of 44% to 77% for a converter efficiency range of 80% to 90%, revealing a significant reduction in energy consumption.

Figure 3:
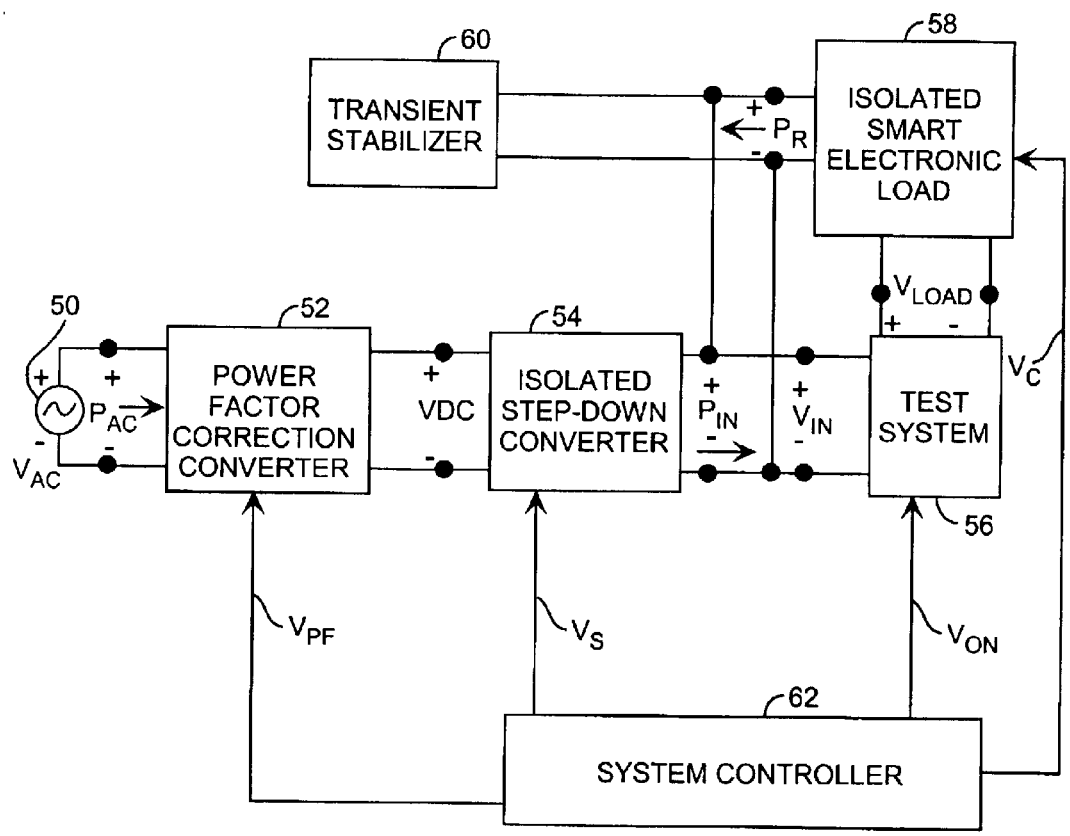
FIG. 3 is a block diagram of an energy recycled power converter system.

Referring to FIG. 3, an energy recycled power converter truncated feedback system receives utility power 10 at a $V_{AC}$ voltage and $P_{AC}$ power and includes a power factor correction converter 52 providing a VDC voltage to an isolated step-down converter 54 providing a stabilized input voltage $V_{IN}$ and input power $P_{IN}$ to a test system 56. The test system 56 has a $V_L$ output connected to an isolated smart electronic load 68 providing recycled power $P_R$ back to the $V_{IN}$ input of the test system 56, and hence, in this configuration, is a truncated feedback system. A transient stabilizer 60 is also connected to the $V_{IN}$ input for ensuring transient and steady state stability of the input voltage to the test system 56. A system controller 62 provides a $V_{PF}$ control signal to the power factor correction converter 52, a $V_S$ control signal to the isolated step-down converter 54, a $V_{ON}$ control signal to the test system 54, and a $V_C$ control signal to the isolated smart electronic load 58. For flexibility of safety implementation without requiring the input and output electrical isolation from the system under test 54, both the step-down converter 54 and the smart electronic load 59 require electrical isolation between respective inputs and outputs. The input and output isolation within the step-down converter 54 and smart electronic load 58 provides inherent flexibility in the interconnection of several tested DC-to-DC converters within the test system 54. The utility power 50 can be a three-phase utility power source grid so that the uniform power sharing among the three phases is achievable among several parallel converters in the test system 56.

Figure 4:
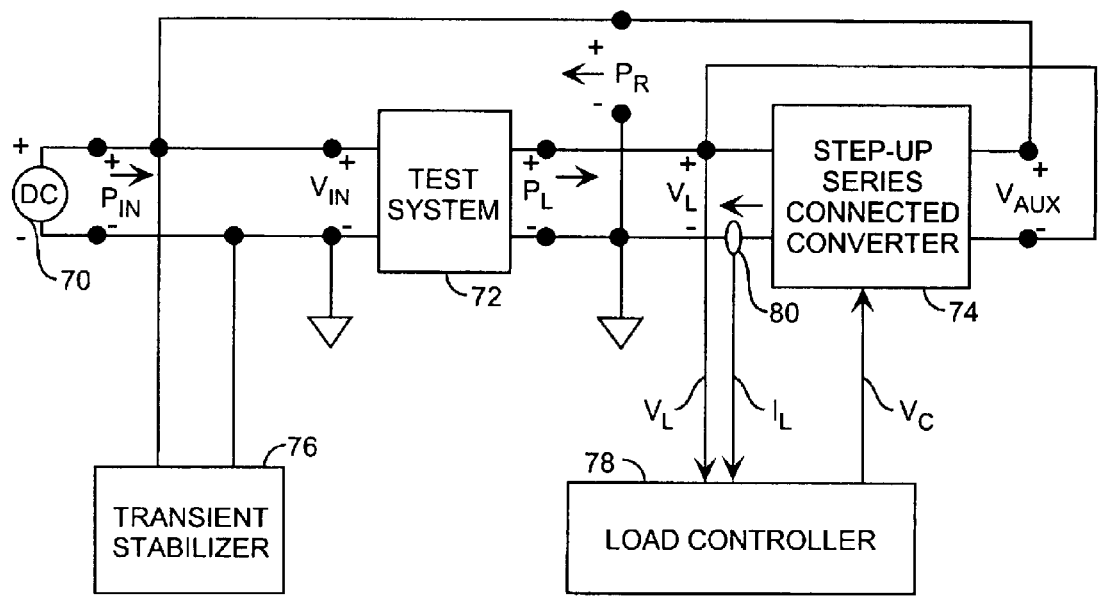
FIG. 4 is a block diagram of an energy recycled power step-up converter system.

Referring to FIG. 4, an energy recycled step-up voltage converter system processes power received from a DC power source 70 providing $P_{IN}$ power and a DC input voltage $V_{IN}$ to a test system 72. The test system 72 provides $P_L$ load power and a $V_L$ load voltage to a step-up series connected converter 74. The converter 74 is effectively a smart electronic load providing a $V_{AUX}$ output to the $V_{IN}$ input of the test system 72. A transient stabilizer 76 is also connected to the $V_{IN}$ input of the test system 72. A current monitor 80 is used to provide an $I_L$ load current signal to a load controller 78. The $V_L$ voltage signal is also fed to the load controller 78. The $V_L$ and $I_L$ signals are fed to and sensed by the load controller 78 for providing a $V_C$ control signal to the step-up series connected converter load 74. The load 74 is a converter having an auxiliary output with an auxiliary voltage between a first load terminal connected to the power input and a second load terminal connected to the load output, for connecting in series the load output of the test system 72 and the auxiliary output of the load 74. The load converter 74 then serving to step-up the load voltage $V_L$ to the input voltage $V_{IN}$ at the power input of the test system 72 by the auxiliary voltage $V_{AUX}$.

The energy recycled step-up voltage converter system has a smart electronic load configuration where the load 74 is a step-up output series connected converter. The load converter 74 alone has its input and output isolated from each other, and, subsequently the output of the load $V_{AUX}$ is connected in series with the input of the load such that the sum of input and output voltages, $V_L$ Plus $V_{AUX}$, is higher. The system is suitable for testing the test system 72 that has step-down output voltage $V_L$, where $V_L$ less than $V_{IN}$, where the test system 72 input and output share the same common return terminal or power ground. The output of the smart electronic load converter 74 is $V_{AUX}$ that is connected to and becomes the input voltage $V_{IN}$ to the test system 72. The smart electronic load converter 74 is controlled by the load controller 78 so that the desired output power $P_L$ is delivered from the test system 72 to the smart electronic load converter 74. The controller 78 is specifically a load controller that is connected to and controls the load 74. The load 74 is a controlled load with controllable load characteristics. The load controller 78 senses the load voltage $V_L$ and senses the load current $I_L$ for controlling the load characteristics to a predetermined load characteristic.

For a given efficiency of the load converter, $\eta_L$, the series-connected step-up smart electronic load configuration offers a load-converter net-efficiency of $\eta_{Load}=P_R/P_L=(1+V_L/V_{AUX})/(1/\eta_L+V_L/V_{AUX})$, where $P_R$ is the recycled power delivered from the smart electronic load 74 to the input of the test system 72. For example, with $\eta_L=0.8$ and $V_L/V_{AUX}=2$, the yield of the smart electronic load net-efficiency is 92.3%, where $\eta_{Load}=0.923$. The percentage of electrical energy conserved is defined as the amount of the testing energy being saved from the recycled energy testing system relative to the actual energy spent in the conventional testing system without energy recycling. The conserved energy percentage is given as a percent of energy being saved and is equal to $\eta_{SUT}*\eta_{Load}$. For $\eta_{Load}=92.3\%$ and $\eta_{SUT}=80\%$, the recycled energy system can conserve about 73.8% of electrical energy, with only 26.2W of power is used for testing of the test system 72 that consumes 100W.

Figure 5:
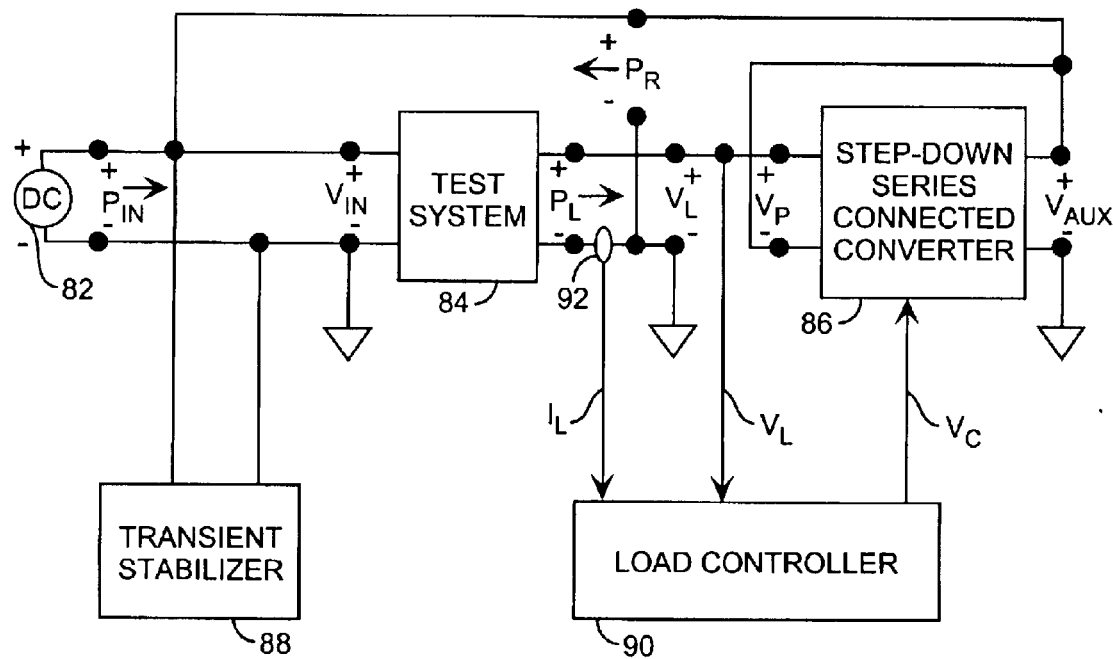
FIG. 5 is a block diagram of an energy recycled power step-down converter system.

Referring to FIG. 5, an energy recycled step-down voltage converter system receives a DC voltage input 82 for providing input power $P_{IN}$ and for providing a $V_{IN}$ input voltage to a test system 84. The DC source 82 can be a non-stiff voltage source that has significant source impedance. The DC power source 82 provides the input power $P_{IN}$ as DC input power at the voltage input $V_{IN}$ of the test system 84. The load 86 is a converter connected to a load output of the test system 84. The test system 84 provides load power $P_L$ and a load voltage $V_L$ to a step-down series connected load converter 86 that is a smart electronic load having an auxiliary output $V_{AUX}$. A transient stabilizer 88 is connected across the DC input to the test system 84 for stabilizing the input voltage $V_{IN}$ to the test system 84 in the presence of fed back recycled power $P_R$. The output of the smart electronic load converter $V_{AUX}$ is controlled by a load controller 90 such that the desired output load power $P_L$ is delivered from the test system 84. The load converter 86 has its input and output isolated from each other, and subsequently the $V_{AUX}$ output of the load 86 is connected to the $V_{IN}$ input of the test system 84, such that, the sum of the load converter input voltage $V_P$ and output voltage $V_{AUX}$, that is $V_P+V_{AUX}$, is always equal to the test system output voltage $V_L$ and the load converter output voltage $V_{AUX}$ becomes a controllable step-down output voltage.

The energy recycled step-down voltage converter system of FIG. 5 is suitable for testing the test system 84 that has a step-up output voltage, where $V_L$ is greater than $V_{IN}$, where the test system 84 input and output share the same common return terminal or power ground with the $V_{AUX}$ energy recycled output return terminal of the smart electronic load converter 86. A current monitor 92 monitors the load current $I_L$ from the test system 84 for providing an $I_L$ sensed current signal to the load controller 90 that also receives the load voltage $V_L$ as a sensed voltage signal. The load controller 90 then provides a $V_C$ control signal to the step-down series connected converter 86. The auxiliary output of the load includes a first load terminal and a second load terminal between which is an auxiliary voltage. The load output of the test system 84 includes a ground terminal connected to ground and a power output terminal connected to an input load terminal of the load 86. The load includes a load input having the input load terminal and an input return terminal. The auxiliary output includes first and second load terminals. The first load terminal is connected to the power input of the test system 84 and connected to the input return terminal input of the load 86. The second load terminal is connected to ground. In the configuration as shown, the load converter 86 serves to step-down the load voltage $V_L$ into the auxiliary voltage $V_{AUX}$ by the load input voltage between the input load terminal and the input return terminal.

For a given efficiency of the load converter $\eta_L$, the series-connected step-down smart electronic load configuration offers the load-converter net-efficiency as $\eta_{LOAD}=P_R/P_L=1-\eta_L)*V_{AUX}/V_L$. For example, $\eta_L=0.7$ and $V_{AUX}/V_L=0.25$, the yield of the smart electronic load net efficiency of $\eta_{LOAD}=92.5\%$. The percentage of electrical energy conserved as a saving is defined as the amount of the testing energy being saved from the recycled-energy testing system relative to the actual energy spent in the conventional testing system without energy recycle and this conserved energy percentage is given as S % being saved=$\eta_{SUT}*\eta_{LOAD}$. For $\eta_{Load}=92.5\%$ and $\eta_{SUT}=80\%$, the recycled-energy testing system can save 74% of electrical energy, which is very dramatic and achievable. Only 26 W of power is used for testing the system under test that consumes 100 W.

Many organizations have already acquired commercial DC voltage power supplies that are basic equipment for both engineering development and product testing. Hence, it can be more convenient and economical to develop the energy recycled testing system using existing DC power supplies. In this case, the test system has its input connected to a DC source and the output connected to a smart electronic load that may be implemented in the form of an isolated DC-to-DC converter with the transient stabilizer connected across the test system input. The system of FIGS. 2, 4, and 5 show a DC input to the respective test systems 34, 72, and 84.

In FIGS. 4 and 5, the smart electronic load configurations use series-connected input-output DC-to-DC converters that allow much higher efficiency of 88% to 98% of recycled power transfer even though the load DC-DC converters may have an efficiency of only 70% to 85%. Because the load converter input and output are isolated from each other, the input and output can be connected in series to directly recycle most of the output power $P_L$ delivered from the test system. The smart electronic load converter of the series-connected configuration processes only a small fraction of the system power such that the output voltage $V_{AUX}$ produced from the loads can be controlled to match the DC voltage across the input of the test system, so that, the series-connected configurations conserve much more energy and consequently further reduce utility expenses. The input and output of the isolated loads and the isolated converters serve to isolate the power supply, that is, the test system from ground noise fluctuations. In the step-down and step-up configurations of FIGS. 4 and 5, respectively, the loads are internally isolated, yet connected externally to the input $V_{IN}$ of the test systems 72 and 84, respectively. In FIGS. 1, 2, and 3, the isolated converters 14, 32, and 54 and smart loads 18, 36, and 58 serve to isolate the test systems from AC power or DC power ground fluctuations.

Figure 6:
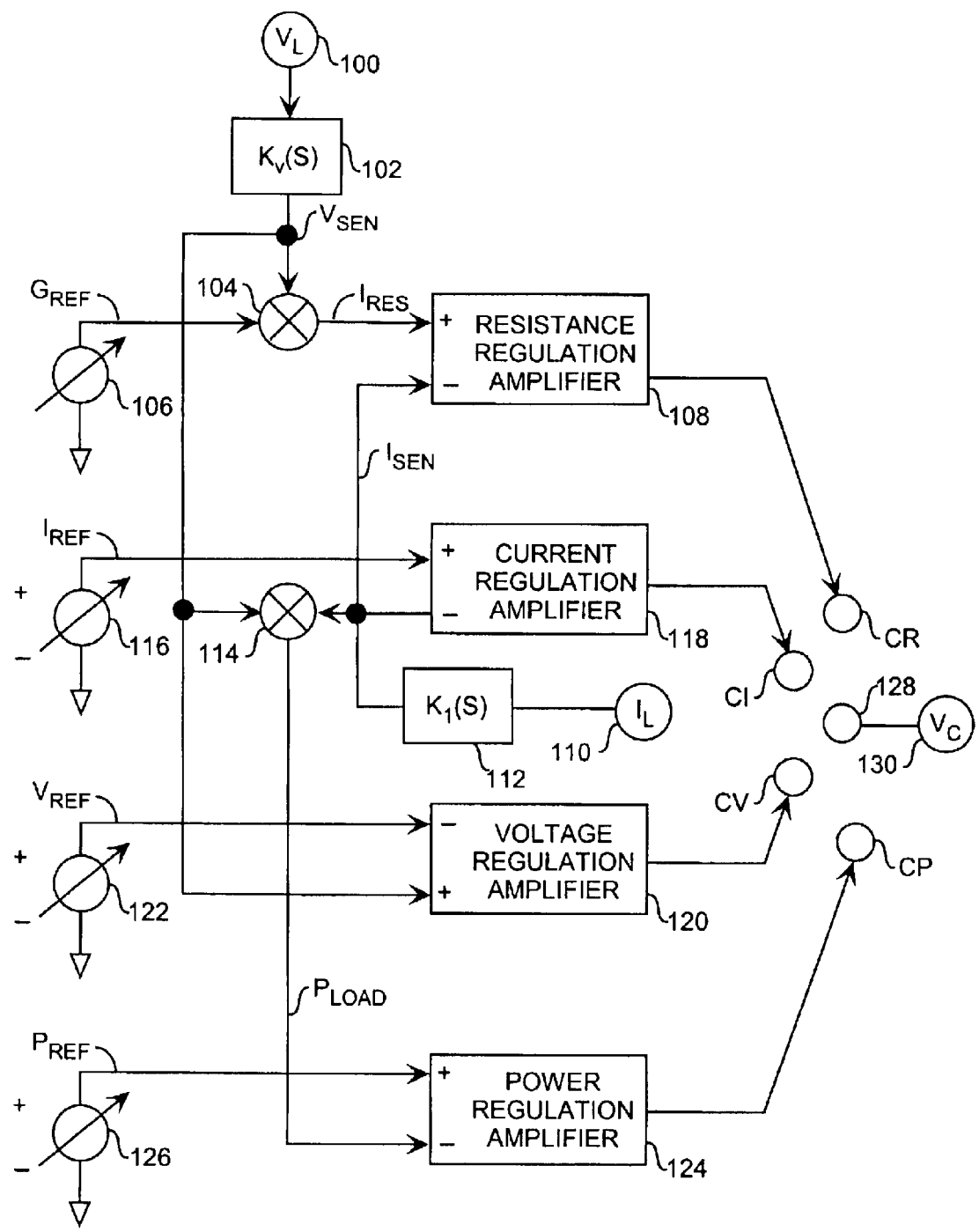
FIG. 6 is a block diagram of a load controller

Referring to all of the Figures, and more particularly to FIG. 6, the controller can provide the $V_{PF}$, $V_S$ and $V_{ON}$ signal by logical sequencing compatible with commonly available converters and power supplies. The controller can also produce the control voltage $V_C$ that regulates the load DC-to-DC converter to absorb more current as the control voltage increases or less current as the control voltage decreases. The sensed load voltage $V_L$ 100 is fed into a voltage scaler 102 that provides a $V_{SEN}$ voltage sensed signal to a voltage multiplier 104 that mixes the $V_{SEN}$ signal and a $G_{REF}$ load conductance signal from a $G_{REF}$ source 106. The multiplier 104 provides an $I_{RES}$ resistive reference current signal that is fed into a resistance regulation amplifier 108 that provides a constant resistor load (CR) output. The sensed load current $I_L$ 110 is fed into a current scaler 112 for providing an $I_{SEN}$ signal that is also fed to the resistance regulation amplifier 108 and fed a power multiplier 114. An $I_{REF}$ signal from an $I_{REF}$ source 116 is fed to a current regulation amplifier 118 that also receives the $I_{SEN}$ signal from the current scaler 112. The current regulation amplifier 118 provides a constant current sink load CI signal. The $V_{SEN}$ signal is fed to a voltage regulation amplifier 120 that also receives a $V_{REF}$ signal from a $V_{REF}$ voltage source 122 for providing a constant voltage sink load CV signal. A power regulation amplifier 124 receives a $P_{REF}$ signal from a power reference source 126 and a $P_{LOAD}$ signal from the power multiplier 114 for providing a constant power load CP signal. The CR, CI, CV, and CP load control signals are fed to a switch 128 for providing a selectable $V_C$ load control signal to the loads in FIGS. 4 and 5, for selecting a desired predetermined load characteristic. Through the sensed $V_L$ voltage and $I_L$ current, sensed at the load DC-to-DC converter input, four types of load characteristics can be controlled by the controller, including a constant resistor load CR, a constant current sink CI, a constant voltage sink CV, and a constant power load CP. The characteristic can be set by setting the load voltage and current scaling factors, $K_V(s)$ and $K_I(s)$ of scalers 102 and 112, respectively, for generating the scaled load voltage $V_{SEN}$ and current $I_{SEN}$ signals for controlling the load characteristics. The scaled load voltage $V_{SEN}$ and current $I_{SEN}$ signals can be low-pass filtered to sufficiently reduce high frequency noise. The respective regulation amplifiers for CR, CI, CV, and CP load characteristics have respective proper frequency compensation circuits such that their stabilized control loops have sufficient stability margins. For a constant resistor load, the load voltage $V_L$ is sensed and scaled as $V_{SEN}$ that is then multiplied by the commanding load conductance signal $G_{REF}$ to generate the resistive reference current $I_{RES}$. Consequently, $I_{RES}$ becomes the commanding current reference for the resistance regulation amplifier 108 to properly deliver the control $V_C$ such that the scaled load current $I_{SEN}$ is regulated at $I_{RES}$. The effective load resistance at low frequency is computed as $R_{Load}=K_I/(K_V*G_{REF})$ ohms. For a constant current sink load, the $I_L$ load current is sensed and scaled as $I_{SEN}$ that is fed to the inverting input of the current regulation amplifier 118. At the non-inverting input of the amplifier, the reference current $I_{REF}$ is the commanding reference current signal for the current regulation amplifier 118 to properly deliver the control $V_C$ such that the scaled load current $I_{SEN}$ is regulated at $I_{REF}$. Consequently, the controlled load current can be expressed as $I_L=I_{REF}/K_I$ amperes. For a constant voltage sink load, the load voltage is sensed and scaled as $V_{SEN}$ that is fed to the non-inverting input of the voltage regulation amplifier 120. At the inverting input of the voltage regulation amplifier 120, $V_{REF}$ is the commanding reference voltage signal for the voltage regulation amplifier 120 to properly deliver the control $V_C$ such that the scaled load voltage $V_{SEN}$ is regulated at $V_{REF}$. Consequently, the controlled load voltage can be expressed as $V_L=V_{REF}/K_V$ volts. For a constant power load, the load voltage $V_L$ and load current $I_L$ are respectively sensed and scaled as $V_{SEN}$ and $I_{SEN}$, that are then multiplied together to produce the load power signal $P_{LOAD}$. The $P_{LOAD}$ signal is then fed to the inverting input of the power regulation amplifier 124. At the non-inverting input of the power regulation amplifier 124, $P_{REF}$ is the commanding reference power signal for the power regulation amplifier 124 to properly deliver the control $V_C$ such that the scaled load power signal $P_{Load}$ is regulated at $P_{REF}$. Consequently, the controlled load power can be expressed as $P_L=P_{REF}/(K_V*K_I)$ watts. In this manner, the load control signal $V_C$ can be used to change the load characteristics of the smart electronic load of FIGS. 4 and 5.

Figure 7:
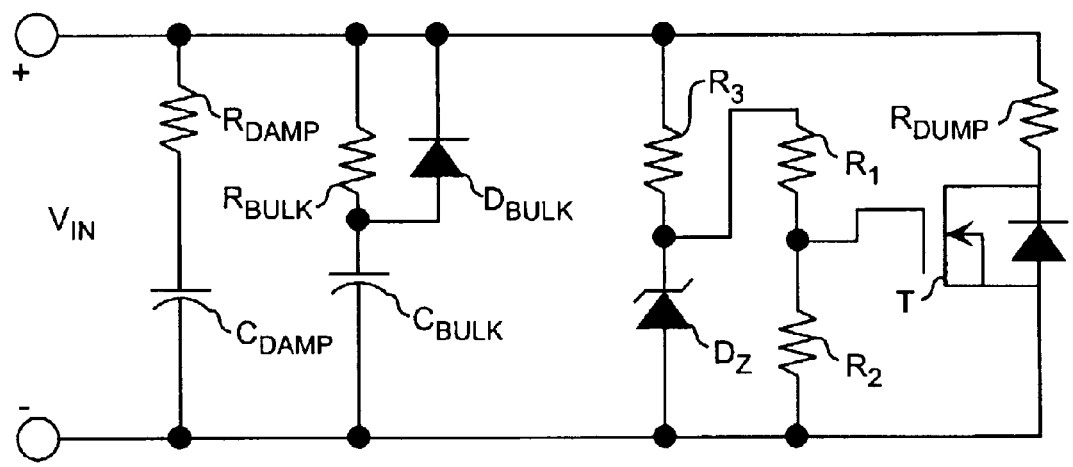
FIG. 7 is a schematic of a transient stabilizer circuit.

Referring to all of the Figures, and more particularly to FIG. 7, the transient stabilizer 20, 38, 60, 76, or 88 is designed to minimize transients on the feed back from a respective load 18, 36, 58, 74, or 86, to the respective test system 16, 34, 56, 72, or 84. The transient stabilizer can absorb AC small signal transients, prevent DC voltage sag, absorb DC large signal transients, and prevent over voltage conditions of the feed back. The transient stabilizer has an $R_{DAMP}$ resistor and a $C_{DAMP}$ capacitor connected in series for small AC signal transient voltage absorption and can also suppress a transient over-voltage condition. The $R_{DAMP}$ resistor and a $C_{DAMP}$ capacitor is effectively an AC damping network that stabilizes the system response in both transient and steady state operations. The transient stabilizer includes an $R_{BULK}$ resistor, a $C_{BULK}$ capacitor connected in series, and a $D_{BULK}$ diode that can be set to slowly absorb the charging current and quickly discharge stored energy to suppress a transient under voltage. The transient stabilizer connected is across the feed back path providing fed back power to stabilize the fed back recycle power and input power. The transient stabilizer includes a DC large transient absorption circuit. An $R_3$ resistor is connected in series with a zener diode $D_Z$ having a common node connected to a voltage divider comprising resistors $R_1$ and $R_2$. A common node between R1 and R2 is connected to a control input of a transistor T connected in series with an $R_{DUMP}$ resistor. The transistor T has a built-in protection diode. As a large DC signal develops across $R_3$ resistor and $D_Z$ zener diodes, the voltage across the zener diode increases until the voltage between the resistors $R_1$ and $R_2$ increases, until the transistor is turned on, thereby conducting current through $R_{DUMP}$ and the transistor, thereby reducing the large overshoot of the positive DC voltage. The protection diode of the transistor begins to conduct in the presence of large negative DC voltages thereby decreasing the negative voltage. The transient stabilizer is a large signal and small signal transient suppression circuit that can be modeled and simulated for a particular system design. Hence, the transient stabilizer is used for stabilization of the voltage and current and for transient suppression of transient voltages and transient current on the feed back path.

In a broad aspect, the invention is directed to a power source for providing input power to the power system receiving input power at a power input and providing load power at a load output to the load having an auxiliary output for feeding back recycled power to the power input of the power system. The power system could comprise a converter and a test system, comprise a power supply, or comprise a plurality of converters, by way of examples. The load functions to recycle energy from the auxiliary output as recycled power to the power input of the power system. A feed back path is used for feeding back the recycled power to the power system. The feed back path connects the auxiliary output of the load to power input of the power system for power reuse for conserving power. The complete system can be enhanced with transient stabilization, controlled regulation, on and off controls, and load characteristic control. The preferred converters, loads, and test systems can be commercially available units. For example, the converter 32 can be a model SRL-40-25 converter, and the test system 34 and the load 36 can be two 28V converters each with parallel input connections and series output connections. The load 36 can then be controlled by a DC bias signal fed to the parallel control pins of the two 28V converters, such as converters PN1002760-105. Hence, the various configurations of the invention can use off the shelf components with custom transient stabilization and load control when desirable.

The invention offers a recycled power system without complex interactions with the utility grid. The invention is characterized as having a power system and a load that feed back unused power back to the power system for recycling of power. The system is applicable to both AC converter and DC converter systems. The system can be implemented in any electrical apparatus having a power supply and a load with an auxiliary output for feeding back power to the power supply. The power supply and load can be integrated into a common unit such as any electrical apparatus having an internal power supply and a load. The system can be an electrooptical system where electrical energy from an input power source is converted into light with unused radiated light being absorbed back into electrical energy and fed back to the power input. The system can be an electromechanical system where electrical energy from an input power source is converted into stored mechanical energy that is then converted back into electrical energy and fed back to a power input. Hence, the system can be adapted to cover a wide range of power systems, power supplies, power testing systems, electromechanical systems, electrooptical systems, and other electronic devices, systems and appliances.

In particular, the invention has direct application to testing laboratories and manufacturers of power converter products that can use the system to evaluate the performance of DC-to-DC power converter systems with cost savings in utility power expenses. The system includes a smart electronic load that absorbs the electrical energy delivered from the system under test and passes the energy back to the DC power source providing the input voltage to the system under test for recycling electrical energy. Reliability can be improved with over current protection, over heat protection, over load protection and short circuit protection. The modular architecture of the system makes the system flexible to test different power rating DC-to-DC converters. The system can improve testing efficiency. The system architecture can be adjusted to test the converters with serial or parallel connections. The system can have many applications, including burn-in DC-to-DC converter testing systems, motor and generator testing systems, DC-AC-DC systems for testing AC-to-DC power supplies, lighting systems with recycled energy, RF transmitter and receiver testing systems, induction and heating testing systems, audio and acoustic amplifier testing systems, and piezoelectric testing systems, among many others. Utility power consumption can be further reduced by incorporating in the system a renewable power source with a maximum power-tracking controller. Those skilled in the art can make enhancements, improvements, and modifications to the invention, and these enhancements, improvements, and modifications may nonetheless fall within the spirit and scope of the following claims.

What is claimed is:

1. A system for conserving power, the system comprising, a power source for providing input power, a power system for receiving the input power at a power input and providing load power at a load output, a load for receiving the load power from the load output and for providing recycled energy from an auxiliary output as recycled power to the power input of the power system, and a feed back path for feeding back the recycled power to the power system, the feed back path connecting the auxiliary output of the load to power input, the recycled power is received by the power system for conserving power, wherein, the power source comprises a DC power source for providing the input power, the input power is DC input power at the power input, and, the load is a converter, the auxiliary output providing an auxiliary voltage between a first load terminal connected to the power input and a second load terminal connected to the load output for connecting the load output and the auxiliary output in series, the load converter serving to step-up the load voltage to an input voltage at the power input by the auxiliary voltage.

2. The system of claim 1 further comprising, a transient stabilizer for stabilization of voltages and current on the feedback path and for transient suppression of transient voltages and transient current on the feed back path.

3. The system of claim 1 wherein the power system comprises, an isolation converter for receiving the input power and providing converted power, the isolation converter serving to isolate the input power from the converted power, and a power supply for receiving the converted power and providing the load power at the load output.

4. A system for conserving power, the system comprising, a power source for providing input power, a power system for receiving the input power at a power input and providing load power at a load output, a load for receiving the load power from the load output and for providing recycled energy from an auxiliary output as recycled power to the power input of the power system, and a feed back path for feeding back the recycled power to the power system, the feed back path connecting the auxiliary output of the load to power input, the recycled power is received by the power system for conserving power, wherein, the power source comprises a DC power source for providing the input power, the input power is DC input power at the power input, the load is a converter, the load output from the power system comprises a ground terminal connected to ground and a power terminal connected to the load, the load comprises a load input having an input load terminal and an input return terminal, the power terminal of the power system is connected to the input load terminal, the auxiliary output comprises a first load terminal and a second load terminal between which is an auxiliary voltage, the second load terminal is connected to ground, the first load terminal is connected to the power input and connected to the input return terminal input of the load, and the load converter serving to step-down the load voltage into the auxiliary voltage by a load input voltage between the input load terminal and the input return terminal.

5. The system of claim 4 further comprising, a controller for turning on and off the input power from the source.

6. The system of claim 4 further comprising, a controller for regulating the input voltage from the power source.

7. The system of claim 4 further comprising, a controller for turning on and off the power system.

8. The system of claim 4 further comprising, a controller for regulating the load voltage.

9. The system of claim 4 further comprising, a controller connected to the load, the load being a controlled load with controllable load characteristics, the controller sensing a load voltage from the load output and sensing load current through the load output to the load, the controller controlling the load characteristics to a predetermined load characteristic, the controller controlling the load to maintain the predetermined load characteristics as a function of the load voltage and load current.

10. The system of claim 4 further comprising, a transient stabilizer for stabilization of voltages and current on the feedback path and for transient suppression of transient voltages and transient current on the feed back path, the transient stabilizer provides over voltage protection, under voltage protection, small signal noise suppression, and stabilizes the feed back path from oscillations.

11. The system of claim 4 wherein, the power system is a power supply.

* * * * *